(12) United States Patent
Panchagnula

(10) Patent No.: US 9,973,767 B2
(45) Date of Patent: May 15, 2018

(54) ADAPTIVE BIT RATE CO-OPERATIVE TRANSCODING

(71) Applicant: ARRIS Enterprises, Inc., Suwanee, GA (US)

(72) Inventor: Ramesh V. Panchagnula, Norcross, GA (US)

(73) Assignee: ARRIS Enterprises LLC, Suwanee, GA (US)

( * ) Notice: Subject to any disclaimer, the term of this patent is extended or adjusted under 35 U.S.C. 154(b) by 269 days.

(21) Appl. No.: 14/478,538

(22) Filed: Sep. 5, 2014

(65) Prior Publication Data

US 2016/0073120 A1   Mar. 10, 2016

(51) Int. Cl.
*H04N 19/40* (2014.01)
*H04N 19/52* (2014.01)
*H04N 19/115* (2014.01)
*H04N 19/164* (2014.01)
*H04N 19/179* (2014.01)
*H04N 19/192* (2014.01)
*H04N 19/59* (2014.01)
H04N 19/34 (2014.01)
H04N 19/513 (2014.01)

(52) U.S. Cl.
CPC ........... *H04N 19/40* (2014.11); *H04N 19/115* (2014.11); *H04N 19/164* (2014.11); *H04N 19/179* (2014.11); *H04N 19/192* (2014.11); *H04N 19/52* (2014.11); *H04N 19/59* (2014.11); *H04N 19/34* (2014.11); *H04N 19/513* (2014.11)

(58) Field of Classification Search
CPC ...... H04N 19/34; H04N 19/52; H04N 19/115; H04N 19/59
See application file for complete search history.

(56) References Cited

U.S. PATENT DOCUMENTS

| | | | |
|---|---|---|---|
| 2009/0274217 A1* | 11/2009 | Boyce | G06T 3/40 375/240.16 |
| 2013/0051767 A1* | 2/2013 | Soroushian | H04N 19/33 386/248 |
| 2013/0058393 A1* | 3/2013 | Soroushian | H04N 21/234372 375/240.01 |
| 2014/0241420 A1* | 8/2014 | Orton-Jay | H04N 19/176 375/240.03 |

OTHER PUBLICATIONS

PCT Search Report & Written Opinion, Re: Application No. PCT/US2015/037766; dated Sep. 11, 2015.

\* cited by examiner

*Primary Examiner* — Dave Czekaj
*Assistant Examiner* — Berteau Joisil
(74) *Attorney, Agent, or Firm* — Bart A. Perkins

(57) ABSTRACT

Methods, systems, and computer readable media can be operable to encode an input video stream into one or more output streams by using information obtained from a first transcoding of the input video stream. During a first encoding of an input video stream, pre-processing, motion estimation, mode decision, and other information can be collected or buffered and can be re-used to encode the input video stream to multiple output video streams at different bitrates, resolutions, and/or frame rates. Motion estimation, macroblock mode decision, and pre-processing data can be manipulated and re-used during the encoding of an input video stream at various resolutions. Data can be re-computed at a new resolution or bitrate to improve visual quality.

7 Claims, 5 Drawing Sheets

ADAPTIVE BIT RATE CO-OPERATIVE TRANSCODING

TECHNICAL FIELD

This disclosure relates to video transcoding for adaptive bitrate streaming.

BACKGROUND

Adaptive bitrate (ABR) or multiple bitrate (MBR) transcoding is used for delivering video over Internet protocol (IP) networks. Typically, in ABR transcoding, a single input stream (e.g., video stream) is ingested by a transcoding device, and the ingested video is transcoded into multiple output streams, each at different resolutions, or bitrates, or both. Generally, in legacy transcoding, a single input stream is transcoded to produce a single output stream.

In order to transcode a single input stream into multiple output streams, current transcoders transcode the single input stream multiple times. In addition to replicating the transcoding process, a synchronization mechanism is generally used to align fragments of multiple output streams. This replication of the transcoding process and addition of a synchronization mechanism can increase the computational complexity requirements of the transcoder.

Therefore, it is desirable to improve upon the methods and systems for ABR transcoding of video streams.

BRIEF DESCRIPTION OF THE DRAWINGS

Like reference numbers and designations in the various drawings indicate like elements.

DETAILED DESCRIPTION

Increased complexity can result from ABR transcoding when multiple output streams are individually transcoded from a single input stream. For example, computations involved with transcoding can become numerous and complex when a single input stream is individually transcoded multiple times. Moreover, a synchronization mechanism might be needed to align the resulting plurality of output streams. Co-operative video transcoding can reduce complexity when transcoding for ABR applications by taking advantage of the fact that the same video content is being transcoded across multiple resolutions and/or bitrates.

In embodiments, various transcoding sub-operations (e.g., pre-processing operations, motion estimation, mode decision, etc.) and sub-operation results can be shared amongst multiple transcoding operations of a single input stream.

Figure 1:
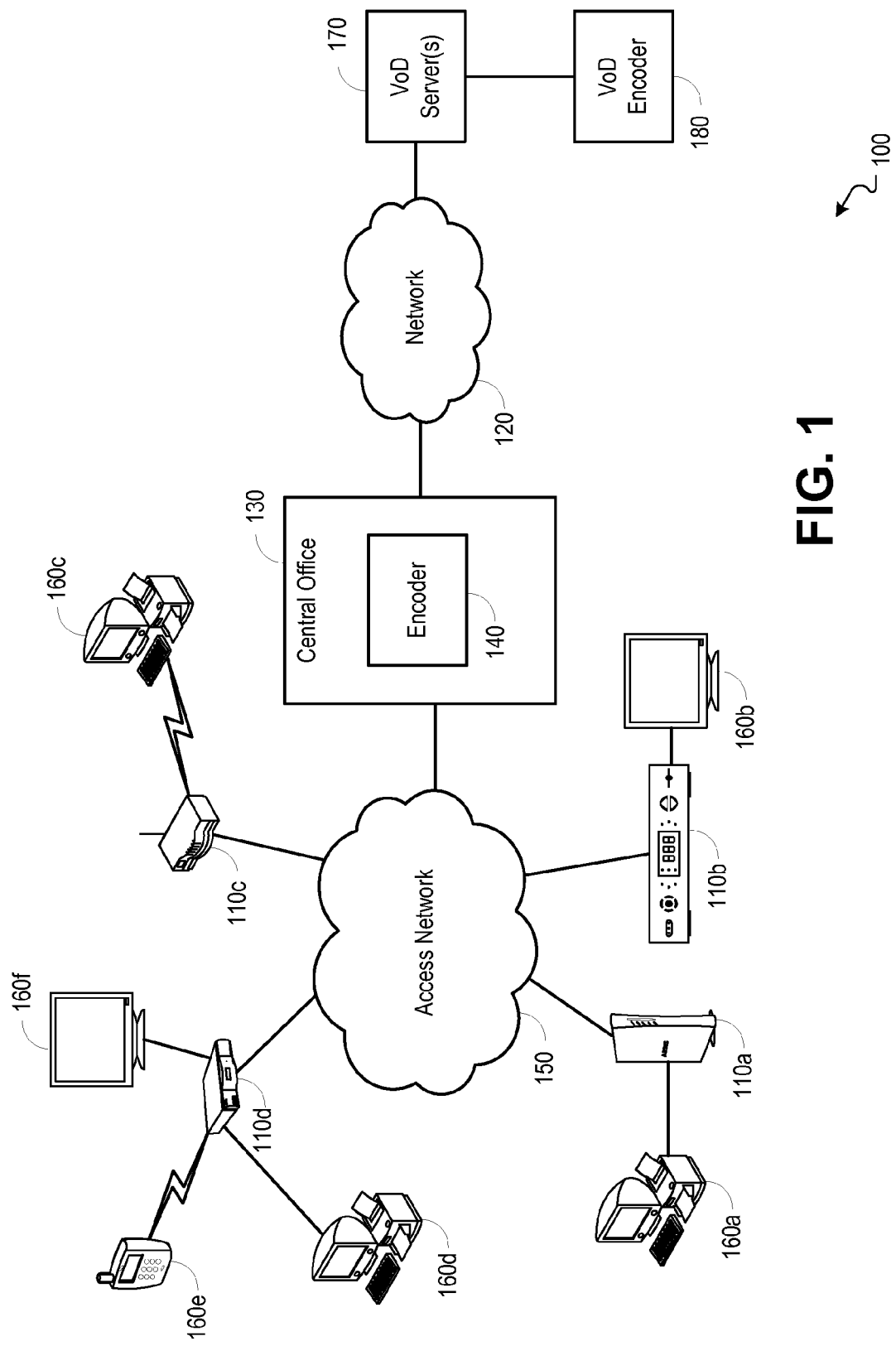
FIG. 1 is a block diagram illustrating an example network environment operable to transcode an input stream into one or more output streams.

FIG. 1 is a block diagram illustrating an example network environment 100 operable to transcode an input stream into one or more output streams. In embodiments, video content can be delivered to customer premise equipment (CPE) devices 110a-d from a network(s) 120 via a central office 130. In embodiments, video content can be transcoded at a central office 130. For example, an encoder 140 can receive an input video stream and transcode the input video stream at various bitrates, resolutions and frame rates. In embodiments, the central office 130 can be a cable headend (e.g., cable modem termination system (CMTS)), digital subscriber line access multiplexer (DSLAM), mobile cellular base station, wireless access point or optical line terminal (OLT).

In embodiments, a central office 130 can deliver video content to CPE devices 110a-d through an access network 150. In embodiments, the access network 150 can be a DOCSIS based Hybrid-Fiber Coax (HFC) network, digital subscriber loop (DSL), mobile cellular network (e.g., 3G, 4G, LTE, etc.), wireless network (e.g., 802.11, 802.16, etc.), fiber to the curb (FTTC), fiber to the premise (FTTP) network, or other broadband access network. In embodiments, CPE device(s) 110a-d can be, for example, a cable modem or embedded media terminal adapter (eMTA) 110a, a set-top box 110b, a wireless router including an embedded cable modem 110c, or a gateway 110d. It should be understood that CPE devices 110a-d can also include a digital subscriber line (DSL) modem, a voice over internet protocol (VOIP) terminal adapter, a video game console, a digital versatile disc (DVD) player, a communications device, an optical network unit (ONS), or the like. CPE device(s) 110a-d can also include a local interface that can forward IP video streams to one or more external devices. For example, the local interface can be based on the Multimedia over Coax Alliance (MoCA), 802.11, Ethernet, universal serial bus (USB), G.hn specifications, or other home networking specifications.

By way of example, FIG. 1 depicts a cable modem or eMTA 110a, a set top box 110b, a wireless router (including an embedded cable modem) 110c, and a gateway 110d. The cable modem or eMTA 110a is shown facilitating communications from the access network 150 to a computer 160a. The set-top box 110b is shown facilitating communications from the access network 150 to a television 160b or a digital video recorder (DVR). A wireless router 110c is shown facilitating wireless communications between a computer 160c and the access network 150. A gateway 110d is shown facilitating communications between the access network 150 and a computer 160d, a mobile device 160e, and a television 160f. In embodiments, a gateway 110d may include an encoder which can be operable to ingest an input video stream and output the input video stream as one or more output video streams at various bitrates, resolutions and/or frame rates.

In embodiments, one or more video on demand (VoD) server(s) 170 can provide video content to one or more central office(s) 130 through a network 120. In embodiments, VoD server(s) 170 can be coupled with a VoD encoder 180. The VoD encoder 180 can be operable to ingest an input video stream from the VoD server(s) 170 and output the input video stream as one or more output video streams at various bitrates, resolutions and/or frame rates It should be understood that while the VoD encoder 180 is shown separated from the VoD server 170, a VoD encoder 180 can be embedded in a VoD server 170.

Figure 2:
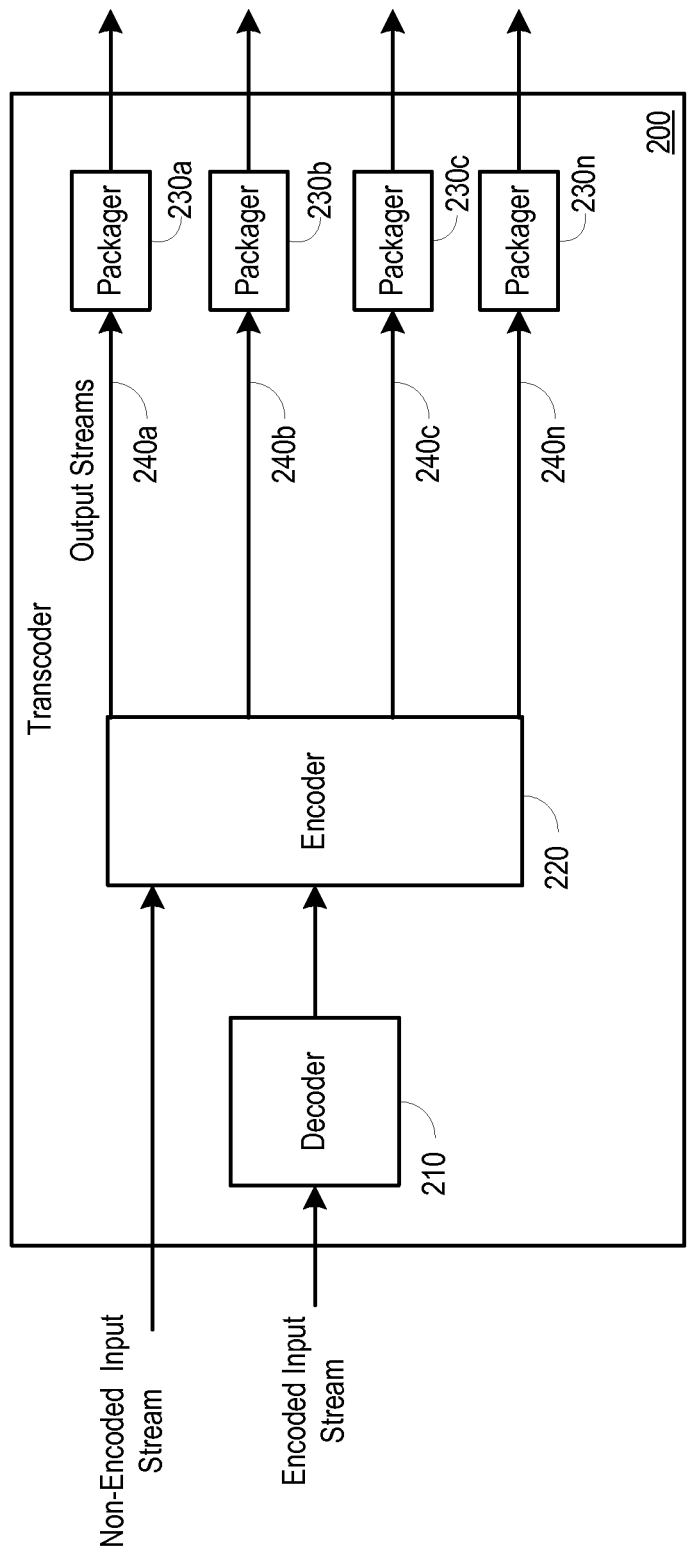
FIG. 2 is a block diagram illustrating an example encoder operable to transcode an input stream into one or more output streams by using information obtained from a first transcoding of the input stream.

FIG. 2 is a block diagram illustrating an example transcoder 200 operable to transcode an input stream into one or more output streams by using information obtained from a first transcoding of the input stream. It should be understood that the transcoder 200 can be implemented in various systems and/or devices in which a video stream is ingested and output at various bitrates, resolutions and/or frame rates. For example, the transcoder 200 can be implemented in a central office 130 of FIG. 1, a gateway 110d of FIG. 1, or in combination with a VoD server, as well as other systems and devices. In embodiments, the transcoder 200 may include a decoder 210, an encoder 220, and one or more packagers 230a-n. In embodiments, the transcoder 200 may include one or more inputs for receiving digital video streams.

In embodiments, the decoder 210 can decode an encoded video stream received by the transcoder 200 and can generate a video output. For example, the decoder 210 can ingest an encoded video stream and output a decoded video stream to the encoder 220.

In embodiments, the encoder 220 can receive an uncompressed video stream/data or a decoded video stream from the decoder 210 and can encode the video stream at various bitrates, resolutions and frame rates using various encoding formats (e.g., MPEG-2, H.264, AVS, MVC, HEVC, etc.). For example, the encoder 220 can encode the input stream at a first bitrate, resolution, and/or frame rate and can output the encoded stream as a first output stream (e.g., 240a).

In embodiments, the encoder 220 can use information obtained from encoding the input stream at the first bitrate, resolution, and/or frame rate to encode the input stream at other bitrates, resolutions, and/or frame rates and the encoder 220 can output the encoded streams as output streams (e.g., output streams 240b-n) stream. For example, the encoder 220 can use information such as motion estimation, macroblock coding mode decision, motion vectors, noise/spatial filtering, inverse telecine, scene change, fade, flash, static scene, edge detection, and other information that is obtained during the encoding of the input stream at the first bitrate, resolution, and/or frame rate. In embodiments, the information obtained from encoding the input stream at the first bitrate, resolution, and/or frame rate can be stored or can be used in real-time to encode the input stream at other bitrates, resolutions, and/or frame rates.

In embodiments, one or more packagers 230a-n can be operable to ingest an output stream from the encoder 220 and output a packaged stream to a destination (e.g., CPE device, television, computer, mobile device, etc.). For example, each of the one or more packagers 230a-n can ingest a stream at a specific bitrate, resolution, and/or frame rate, and can output a packages stream to a specific device (e.g., client devices 160d-f of FIG. 1) or network (e.g., access network 150 of FIG. 1). In embodiments, the packagers 230a-n can deliver video in any format, such as HTTP live streaming (HLS), HTTP smooth streaming (HSS), HTTP dynamic streaming (HDS), and dynamic adaptive streaming over HTTP (DASH), depending on end device playback requirement(s).

Figure 3:
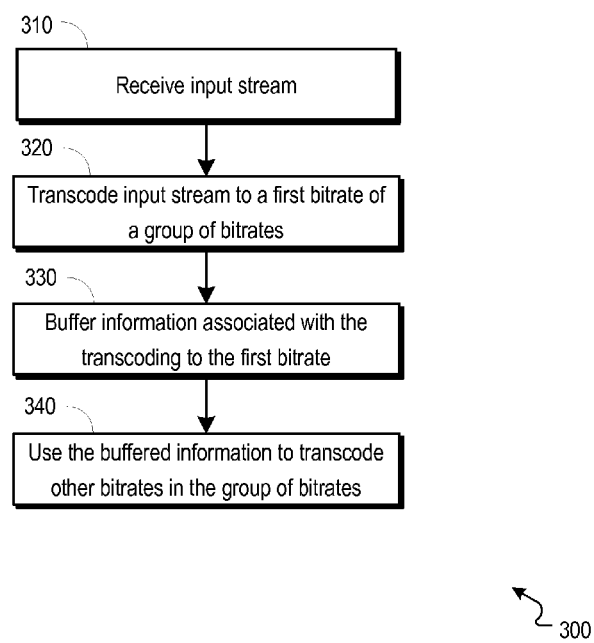
FIG. 3 is a flowchart illustrating an example process for transcoding an input stream into a plurality of output streams, wherein each of the plurality of output streams has a different bitrate.

FIG. 3 is a flowchart illustrating an example process 300 for transcoding an input stream into a plurality of output streams, wherein each of the plurality of output streams has a different bitrate. The process 300 can begin at 310 where an input video stream is received by a transcoding device (e.g., transcoder 200 of FIG. 2). In embodiments, the input video stream can be an IP stream. In embodiments, content embodied in a single video stream may be transcoded into multiple output streams, wherein each of the output streams are transcoded at different bitrates and/or resolutions. The various bitrates and/or resolutions at which the input video stream is requested or scheduled to be transcoded can make up a bitrate group and/or resolution group associated with the input video stream.

At 320, the input video stream can be transcoded to a first bitrate among a group of bitrates (e.g., all of the bitrates at which the input video stream is to be transcoded) associated with the input video stream. The input video stream can be transcoded to a first bitrate, for example, by an encoder (e.g., encoder 220 of FIG. 2). In embodiments, the first bitrate can be the optimal bitrate of the group of bitrates. For example, the optimal bitrate can be selected based on various criteria or factors including the highest bitrate in the group, the bitrate at or around the mid-point of bitrates in the group, the most common bitrate, the bitrate from which the greatest number of other bitrates in the group can be transcoded, and other criteria or factors, such as complexity of the video content.

At 330, information associated with the transcoding of the input video stream to the first bitrate of the group of bitrates can be buffered. Information associated with the transcoding can be buffered, for example, by an encoder (e.g., encoder 220 of FIG. 2). Information associated with the transcoding may include pre-processing, noise filtering, inverse telecine, scene change, fade, flash, static scene, edge detection, motion estimation, mode decision cost, motion vector and other information associated with the input video stream. In embodiments, an encoder can temporarily buffer or store information obtained or gathered during the transcoding of the input video stream at the first bitrate. For example, during the transcoding of the input video stream to the first bitrate, the best motion vector, sum of absolute differences (SAD), and/or sum of absolute transformed differences (SATD) or any other cost metric for each individual block shape and reference picture can be computed and can be buffered and/or stored.

At 340, information associated with the transcoding of the input video stream to the first bitrate of the group of bitrates can be used to transcode the input video stream to other bitrates in the group of bitrates. The information can be used to transcode the input video stream to other bitrates, for example, by an encoder (e.g., encoder 220 of FIG. 2). In embodiments, an encoder can use the information buffered at stage 330 to compute information for transcoding the input video stream to other bitrates. For example, motion vector costs obtained from transcoding the input video stream to the first bitrate can be scaled using the following Formula 1.

$$MV\_cost(b_i) = MV\_cost(b_n) * f(QP_n, QP_i) \qquad \text{Formula 1}$$

In Formula 1, $MV\_cost(b_i)$ is a motion vector cost scaled for use in the transcoding of the input video stream to a next bitrate, $MV\_cost(b_n)$ is the motion vector cost obtained from transcoding the input video stream to the first bitrate, $QP_n$ is the average quantizer value for a picture while the input video stream is encoded at some number of bitrates ($b_n$), and $QP_i$ is the quanitizer value for the current picture. The function, $f(QP_n, QP_i)$, can be modeled by computing the motion estimation cost when the reference picture and the current picture are coded at different quantizer values for a number of pictures.

Figure 4:
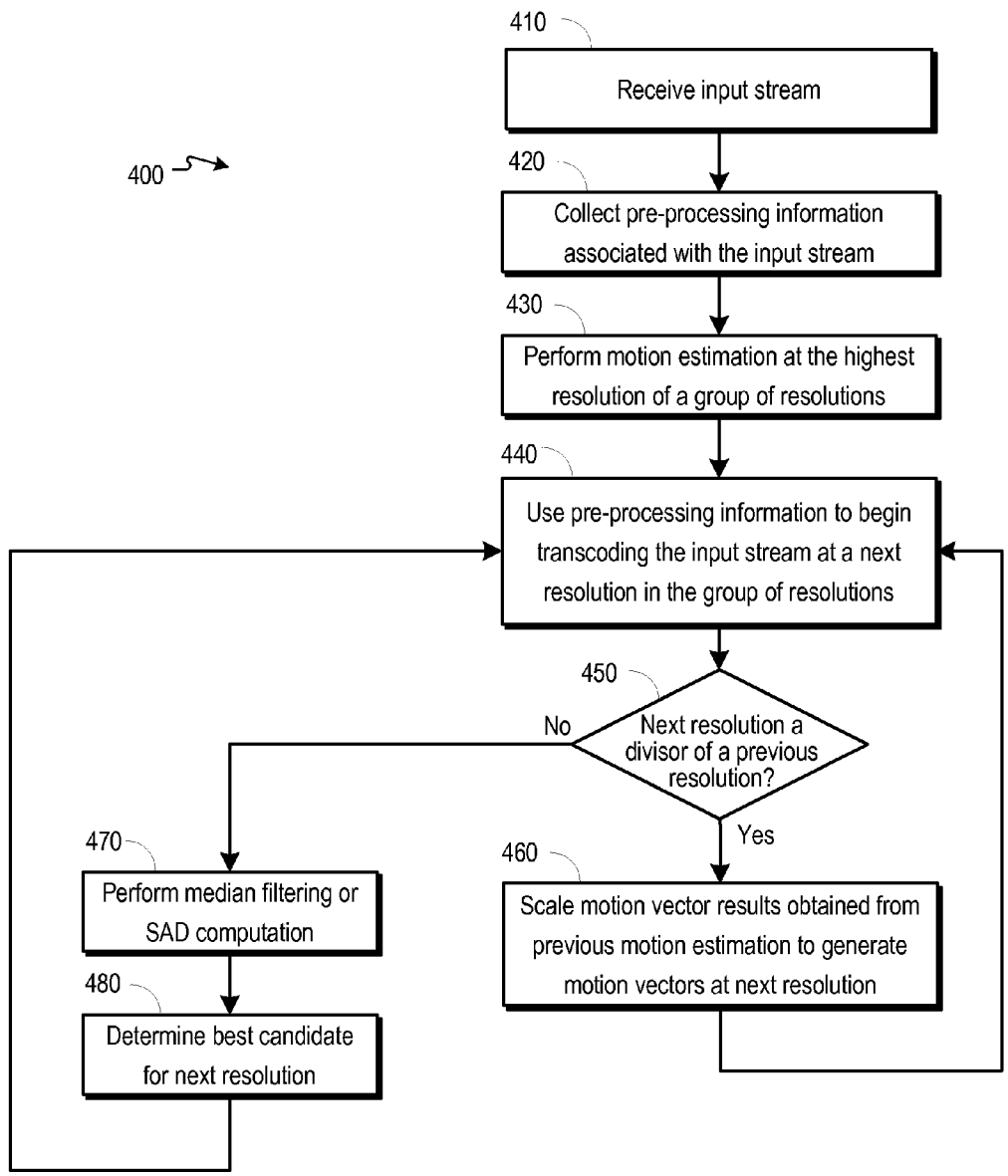
FIG. 4 is a flowchart illustrating an example process for transcoding an input stream into a plurality of output streams, wherein each of the plurality of output streams has a different resolution.

FIG. 4 is a flowchart illustrating an example process 400 for transcoding an input stream into a plurality of output streams, wherein each of the plurality of output streams has a different resolution. The process 400 can begin at 410 where an input video stream is received by a transcoding device (e.g., transcoder 200 of FIG. 2). In embodiments, the input video stream can be an IP stream. In embodiments, content embodied in a single video stream may be transcoded into multiple output streams, wherein each of the output streams have different bitrates and/or resolutions. The various bitrates and/or resolutions at which the input video stream is requested or scheduled to be transcoded can make up a bitrate group and/or resolution group associated with the input video stream.

At 420, pre-processing information associated with the input video stream can be collected. Pre-processing information (e.g., noise, spatial filtering, inverse telecine, scene change, fade, flash, static scene, edge detection, statistics for rate allocation such as complexity of video content, and others) can be collected, for example, by an encoder (e.g., encoder 220 of FIG. 2). In embodiments, pre-processing information associated with the input stream can be collected during the transcoding of the input video stream to a first bitrate, resolution, and/or frame rate. For example, an encoder 220 can buffer and/or store pre-processing information obtained during transcoding of the input video stream to a first bitrate, resolution, and/or frame rate, and can use the pre-processing information for subsequent transcoding of the input video stream into other bitrates, resolutions, and/or frame rates.

At 430, motion estimation can be performed at the highest resolution of a group of resolutions. Motion estimation can be performed, for example, by an encoder (e.g., encoder 220 of FIG. 2). In embodiments, an encoder 220 can compute motion vectors for macroblocks (e.g., a 16×16 pixel blocks) in the input video stream during motion estimation of the input video stream at the highest resolution of a group of resolutions.

At 440, pre-processing information collected at 420 can be used to begin transcoding the input video stream to a next resolution in the group of resolutions. Pre-processing information can be used during the transcoding, for example, by an encoder (e.g., encoder 220 of FIG. 2). In embodiments, the encoder 220 can begin transcoding the input video stream to a next resolution without re-calculating pre-processing information associated with the input video stream.

At 450, a determination can be made whether the next resolution (e.g., the next resolution identified at 440) is a multiple of a resolution for which motion estimation has been performed. The determination can be made, for example, by an encoder (e.g., encoder 220 of FIG. 2). For example, the next resolution is a multiple of a previous resolution where the horizontal number of pixels and the vertical number of pixels of the next resolution are even divisors of the horizontal number of pixels and the vertical number of pixels, respectively, of the previous resolution (e.g., 320×180, 640×360, and 960×540 are resolutions that are even divisors of the resolution 1920×1080).

Where, at 450, the determination is made that the next resolution is an even divisor of a previous resolution, motion vectors computed during motion estimation of the input video stream at the previous resolution can be scaled to generate motion vectors for the next resolution at 460. The motion vectors can be scaled, for example, by an encoder (e.g., encoder 220 of FIG. 2), by multiplying the previous motion vector by the ratio of the previous resolution over the target resolution. After motion vectors are scaled for the next resolution, the process 400 can return to 440.

Where, at 450, the determination is made that the next resolution is not a multiple of a previous resolution, median filtering or SAD computation can be performed, at 470, on the motion vectors computed during motion estimation of the input video stream at the highest resolution of the group of resolutions. Median filtering or SAD computation can be performed, for example, by an encoder (e.g., encoder 220 of FIG. 2).

At 480, a best motion vector candidate with the lowest cost computed during motion estimation of the input video stream at the highest resolution can be selected for use as a motion vector for transcoding the input video stream to the next resolution. The best motion vector candidate with the lowest cost can be selected, for example, by an encoder (e.g., encoder 220 of FIG. 2). After the best motion vector is selected, the process 400 can return to 440. In embodiments, additional processing for sub-pixel motion vector refinement (e.g., direct/skip and intra-macroblock mode candidates) can be performed.

In embodiments, when reusing information from a first bitrate or resolution, where additional processing is performed (e.g., for calculating the best cost for the scaled full-pixel motion vector, sub-pixel motion vector refinement, direct/skip and intra-macroblock mode candidates), the increase in visual quality can be significant.

Figure 5:
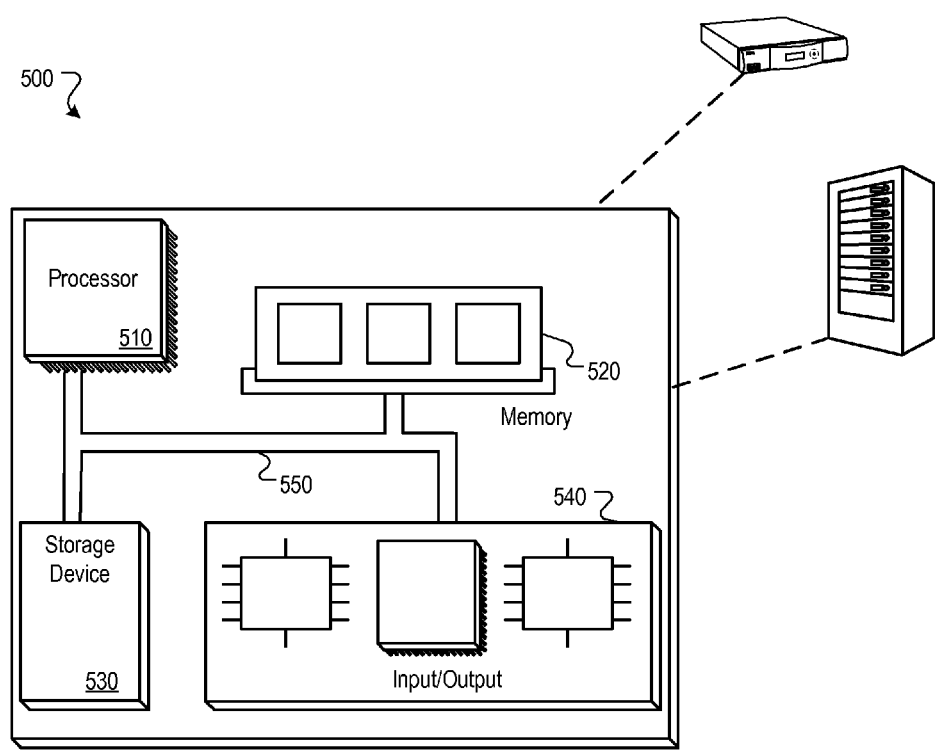
FIG. 5 is a block diagram of a hardware configuration operable to transcode an input stream into one or more output streams.

FIG. 5 is a block diagram of a hardware configuration 500 operable to transcode an input stream into one or more output streams. While a CMTS 125 and a gateway 110d are shown, it should be understood that an encoder operable to encode an input stream into one or more output streams can be embedded into or coupled with any device that is used to transcode and/or encode an input stream. The hardware configuration 500 can include a processor 510, a memory 520, a storage device 530, and an input/output device 540. Each of the components 510, 520, 530, and 540 can, for example, be interconnected using a system bus 550. The processor 510 can be capable of processing instructions for execution within the hardware configuration 500. In one implementation, the processor 510 can be a single-threaded processor. In another implementation, the processor 510 can be a multi-threaded processor. The processor 510 can be capable of processing instructions stored in the memory 520 or on the storage device 530.

The memory 520 can store information within the hardware configuration 500. In one implementation, the memory 520 can be a computer-readable medium. In one implementation, the memory 520 can be a volatile memory unit. In another implementation, the memory 520 can be a non-volatile memory unit.

In embodiments, the storage device 530 can be capable of providing mass storage for the hardware configuration 500. In one implementation, the storage device 530 can be a computer-readable medium. In various different implementations, the storage device 530 can, for example, include a hard disk device, an optical disk device, flash memory or some other large capacity storage device. In other implementations, the storage device 530 can be a device external to the hardware configuration 500.

The input/output device 540 provides input/output operations for the hardware configuration 500. In one implementation, the input/output device 540 can include one or more of a network interface device (e.g., an Ethernet card), a serial communication device (e.g., an RS-232 port), one or more universal serial bus (USB) interfaces (e.g., a USB 2.0 port) and/or a wireless interface device (e.g., an 802.11 card). In another implementation, the input/output device can include driver devices configured to receive input data and send output data to other input/output devices, such as one or more display devices (e.g., television, computer, mobile device, etc.), as well as sending communications and video streams to, and receiving communications and video streams from one or more networks (e.g., access network 150 of FIG. 1, network(s) 120 of FIG. 1, etc.).

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal (e.g., a machine generated electrical, optical, or electromagnetic signal) that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of nonvolatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display (e.g., a CRT (cathode ray tube) or LCD (liquid crystal display) monitor) for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that in embodiments the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In embodiments, multitasking and parallel processing may be advantageous.

I claim:

1. A computer-implemented method comprising:
receiving an input stream;
determining an optimal bitrate, wherein the optimal bitrate is selected from a group of bitrates, wherein the group of bitrates comprise different bitrates associated with an adaptive bitrate streaming application, and wherein the optimal bitrate comprises the bitrate from which an optimal number of other bitrates from the group of bitrates may be encoded;
encoding the input stream to a first encoded stream, wherein the first encoded stream is encoded at the optimal bitrate, and wherein the first encoded stream is encoded at a highest resolution from a group of resolutions;
storing encoding data generated during the encoding of the input stream to the first encoded stream, wherein the stored encoding data comprises motion vectors associated with one or more blocks of the first encoded stream;
encoding the input stream to a next encoded stream using the stored encoding data, wherein the next encoded stream is encoded at another bitrate of the group of bitrates, and wherein the next encoded stream is encoded at a next resolution in the group of resolutions;
determining whether the next resolution in the group of resolutions is an even divisor of the first resolution;
based upon the determination whether the next resolution in the group of resolutions is an even divisor of the first resolution, selecting a method for determining an optimal motion vector, wherein the selection of a method for determining an optimal motion vector comprises:
if the next resolution in the group of resolutions is an even divisor of the first resolution:
scaling the motion vectors associated with the first encoded stream to generate motion vectors for one or more blocks associated with the next encoded stream; and
calculating a best cost for scaled full-pixel motion vectors, sub-pixel motion vector refinement, and skip and intra-macroblock mode candidates; and
if the next resolution is not an even divisor of the first resolution:
computing a sum of absolute differences for the motion vectors associated with one or more blocks of the first encoded stream;
selecting a best motion vector from the motion vectors associated with the first encoded stream based on the computed sum of absolute differences; and
using the best motion vector in the encoding of the input stream to the next encoded stream.

2. The computer-implemented method of claim 1, wherein the optimal bitrate is the highest bitrate in the group of bitrates.

3. The computer-implemented method of claim 1, wherein the optimal bitrate is the median bitrate of the group of bitrates.

4. The computer-implemented method of claim 1, wherein the stored encoding data comprises pre-processing data, motion estimation data, and mode decision data associated with the first encoded stream.

5. A system, comprising:
an interface operable to be used to send and receive video streams;
a data store operable to store computer program instructions and provide temporary storage for the system; and
a processor operable to execute said computer program instructions, the computer program instructions being operable to cause the processor to:
determine an optimal bitrate, wherein the optimal bitrate is selected from a group of bitrates, wherein the group of bitrates comprise different bitrates associated with an adaptive bitrate streaming application, and wherein the optimal bitrate comprises the bitrate from which an optimal number of other bitrates from the group of bitrates may be encoded;
encode an input video stream to a first encoded stream, wherein the first encoded stream is encoded at the optimal bitrate, and wherein the first encoded stream is encoded at the highest resolution from a group of resolutions;
store encoding data generated during encoding of the input video stream to the first encoded stream, wherein the stored encoding data comprises motion vectors associated with one or more blocks of the first encoded stream;
encode the input video stream to a next encoded stream using the stored encoding data, wherein the next encoded stream is encoded at another bitrate of the group of bitrates, and wherein the next encoded stream is encoded at a next resolution in the group of resolutions;
determine whether the next resolution in the group of resolutions is an even divisor of the first resolution; and
based upon the determination whether the next resolution in the group of resolutions is an even divisor of the first resolution, selecting a method for determining an optimal motion vector, wherein the selection of a method for determining an optimal motion vector comprises:
if the next resolution in the group of resolutions is an even divisor of the first resolution, scale the motion vectors associated with the first encoded stream to generate motion vectors for one or more blocks associated with the next encoded stream; and
if the next resolution in the group of resolutions is not an even divisor of the first resolution:
compute a sum of absolute differences for the motion vectors associated with one or more blocks of the first encoded stream;
select a best motion vector from the motion vectors associated with the first encoded stream based on the computed sum of absolute differences; and
use the best motion vector in the encoding of the input video stream to the next encoded stream.

6. One or more non-transitory computer readable media operable to execute on one or more processors, the computer readable being operable to cause the one or more processors to perform the operations comprising:
- receiving an input stream;
- determining an optimal bitrate, wherein the optimal bitrate is selected from a group of bitrates, wherein the group of bitrates comprise different bitrates associated with an adaptive bitrate streaming application, and wherein the optimal bitrate comprises the bitrate from which an optimal number of other bitrates from the group of bitrates may be encoded;
- encoding the input stream to a first encoded stream, wherein the first encoded stream is encoded at the optimal bitrate, and wherein the first encoded stream is encoded at the highest resolution from a group of resolutions;
- storing encoding data during encoding of the input stream to the first encoded stream, wherein the stored encoding data comprises motion vectors associated with one or more blocks of the first encoded stream; and
- encoding the input stream to a next encoded stream using the stored encoding data, wherein the next encoded stream is encoded at another bitrate of the group of bitrates, and wherein the next encoded stream is encoded at a next resolution in the group of resolutions;
- determining whether the next resolution in the group of resolutions is an even divisor of the first resolution; and
- based upon the determination whether the next resolution in the group of resolutions is an even divisor of the first resolution, selecting a method for determining an optimal motion vector, wherein the selection of a method for determining an optimal motion vector comprises:
- if the next resolution in the group of resolutions is an even divisor of the first resolution:
  - scaling the motion vectors associated with the first encoded stream to generate motion vectors for one or more blocks associated with the next encoded stream; and
- if the next resolution in the group of resolutions is not an even divisor of the first resolution:
  - computing a sum of absolute differences for the motion vectors associated with one or more blocks of the first encoded stream;
  - selecting a best motion vector from the motion vectors associated with the first encoded stream based on the computed sum of absolute differences; and
  - using the best motion vector in the encoding of the input stream to the next encoded stream.

7. The non-transitory computer readable media of claim 6, wherein the optimal bitrate is the highest bitrate in the group of bitrates or the median bitrate of the group of bitrates.

* * * * *